M. Grover.

Pitman.

N° 85,926.  Patented Jan. 19, 1869.

Witnesses:
Normand E. Ellsworth
Enos Grover

Inventor:
Manasseh Grover.

UNITED STATES PATENT OFFICE.

MANASSEH GROVER, OF CLYDE, OHIO.

IMPROVEMENT IN PITMEN.

Specification forming part of Letters Patent No. 85,926, dated January 19, 1869.

*To all whom it may concern:*

Be it know that I, MANASSEH GROVER, of Clyde, in the county of Sandusky and State of Ohio, have invented a new and useful Improved Mode of Constructing Pitmen to Reapers and Mowers, and to all other machinery to which it may be adapted, in such a mode as to facilitate the tightening of the boxes around the axle-trees or journals and bolts or pivots; and I do hereby declare that the following is a full, clear, and exact description of the construction and operation of the same, reference being had to the accompanying drawing, and to the letters of reference marked thereon, making a part of this specification, in which—

Figure 1:
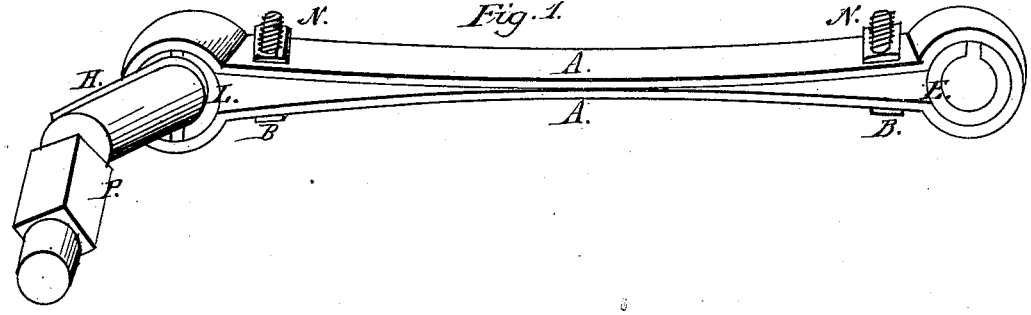
Figure 2:
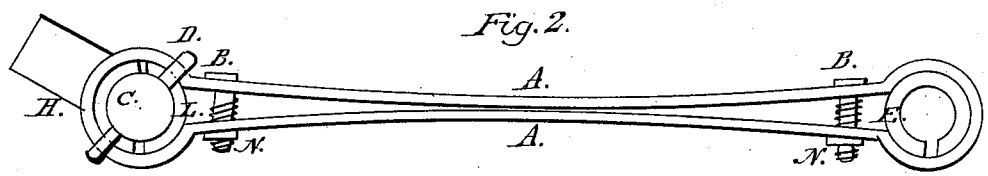
Figure 3:
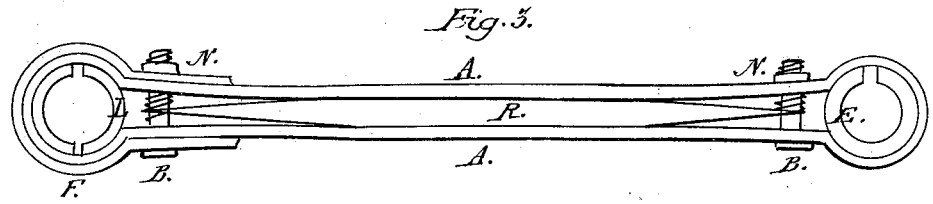

Figure 1 is a perspective view of the pitman. Fig. 2 is a longitudinal elevation. Fig. 3 is the same elevation, representing an addition hereinafter described.

The nature of my invention consists in constructing pitmen to reapers and mowers, and to all other machinery to which they may be adapted, in such a mode as to facilitate the tightening of the boxes around the axle-trees or journals and bolts or pivots.

One end of the pitman is always attached to the axle-tree or journal of a crank or its equivalent, and the other end is generally attached either to a bolt or pivot; but the boxes of each end are tightened by the same mode, which may be used only on one end of the pitman at a time when inconvenient to use it on each end.

To enable others skilled in the art to make and use my invention, I will proceed to describe its construction and operation.

A A, as seen in the accompanying drawings, are two bars, situated nearly parallel to each other, (including a flexible curve firmly united to each end,) of steel or iron, or any other suitable material. The two flexible curves encircle the two boxes L and E. The two bolts B B pass through the two bars A A near the said curves, and, by means of the two nuts N N and the two bolts B B, the curves are adjusted or contracted sufficiently to tighten the box L around the pin C and the box E around its bolts or pivots.

The box L is formed in two parts, with two spaces between them, to admit of adjustment or contraction. The box E is formed with but one space, to admit of adjustment or contraction.

Representing that the boxes may be formed in that mode, and that they may be used on each end of the pitman, letter F, Fig. 3, represents an additional flexible curve, inclosing the other or inner curve, for the purpose of adding greater strength when deemed necessary, and may be used on each end of the pitman R. Same figure represents a longitudinal brace or support, for the purpose of adding greater strength to the longitudinal portion of the pitman when deemed necessary.

P is a revolving shaft, to which the crank H is attached. C is the pin attached to the crank H, and by the revolving motion of the shaft P the pitman is given its proper motion. D is a pin, preventing the pitman from becoming detached from the pin C.

What I claim as my invention, and desire to secure by Letters Patent, is—

1. The flexible curved bars A A, made in one piece, arranged and operating substantially as and for the purpose herein set forth.

2. The additional flexible curved bar F and the brace or support R, in combination with the bars A A, arranged and operating substantially as and for the purpose herein set forth.

MANASSEH GROVER.

Witnesses:
E. D. BENNER,
M. BENNER.